No. 611,517. Patented Sept. 27, 1898.
O. SELDIS.
LATHE TOOL AND HOLDER THEREFOR.
(Application filed Aug. 14, 1897.)
(No Model.) 2 Sheets—Sheet 1.
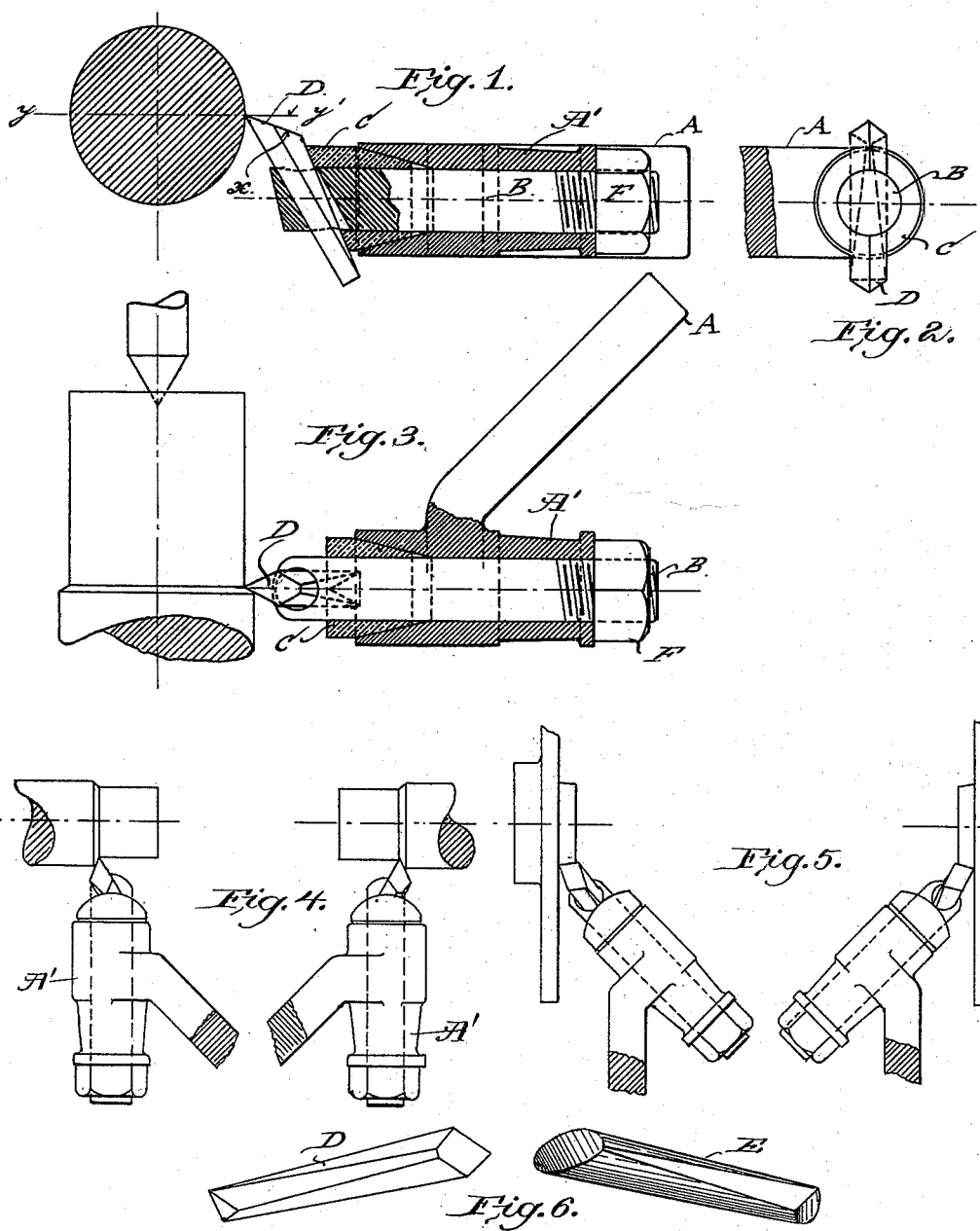
WITNESSES:
Otis Lindquist.
Arthur L. Randall.
INVENTOR
Oscar Seldis
BY
ATTORNEY.

No. 611,517. Patented Sept. 27, 1898.
O. SELDIS.
LATHE TOOL AND HOLDER THEREFOR.
(Application filed Aug. 14, 1897.)
(No Model.) 2 Sheets—Sheet 2.
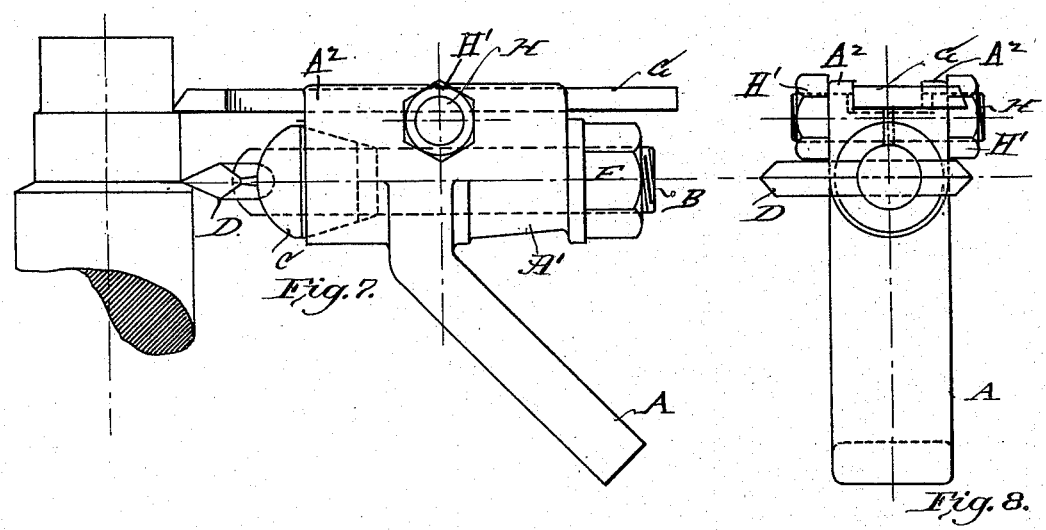
WITNESSES:
Otis Lindquist.
Arthur F. Randall.
INVENTOR
Oscar Seldis
BY
ATTORNEY.

UNITED STATES PATENT OFFICE.

OSCAR SELDIS, OF BOSTON, MASSACHUSETTS.

LATHE-TOOL AND HOLDER THEREFOR.

SPECIFICATION forming part of Letters Patent No. 611,517, dated September 27, 1898.

Application filed August 14, 1897. Serial No. 648,263. (No model.) Patented in Germany August 22, 1895, No. 88,211.

*To all whom it may concern:*

Be it known that I, OSCAR SELDIS, a subject of the Emperor of Germany, residing at Boston, county of Suffolk, and State of Massachusetts, have invented an Improvement in Lathe-Tools and Holders Therefor, (for which I have obtained a patent in Germany, No. 88,211, dated August 22, 1895,) of which the following description, in connection with the accompanying drawings, is a specification, like letters on the drawings representing like parts.

This invention has for its object to improve the construction of lathe-tools and lathe-tool holders, to the end that the tool may be very securely held in position and may be adjusted to different inclinations and also to different elevations and the difficulties now experienced with forged tools overcome, and at the same time the construction is simplified and its cost reduced.

In accordance with this invention the stock is composed of a shank and a head, the latter having a hole through it for a bolt, which is formed with a suitable eye or transverse opening at one end adapted to receive the tool, and one end of said bolt-receiving hole is enlarged and made tapering to receive a tapering or conical collar which may be placed upon and moved along on said bolt, and said tapering collar is disposed on the bolt so as to overlie the opening containing the tool and to thereby form or present an abutting wall at one side of said opening for said tool, and adjustment of the tool is obtained by sliding said tapering collar along on said bolt and also by turning said collar on said bolt. The opposite end of the bolt projects beyond the head and is screw-threaded to receive upon it a nut by means of which the parts are tightly drawn together and held in place. The tool-receiving hole is partially covered and made smaller by the collar on said bolt sliding over the same, and the tool which enters said hole is made tapering or wedge-shaped, so that the working pressure may assist in clamping said tool in the tool-holder.

The tool-holder may have the bolt which passes through the stock formed with a V-shaped rest for the tool, if desired.

Figure 1 shows in longitudinal section a lathe-tool and tool-holder embodying this invention; Fig. 2, an end view of the parts shown in Fig. 1; Fig. 3, a longitudinal section of the parts shown in Fig. 1, taken on the dotted line $x$. Fig. 4 shows right and left positions of the tool-holder and tool. Fig. 5 shows other right and left positions of the tool-holder and tool. Fig. 6 is a perspective view of the tools; Fig. 7, a plan view of the tool-holder and tool shown in Fig. 1 having an additional tool-support and tool; Fig. 8, an end view of the parts shown in Fig. 7.

The stock is composed of a shank A and a head A', the latter having a hole through it lengthwise, which is made tapering at one end. A bolt B is contained in said hole in the head A', which is made longer than the head so as to project therefrom at each end, and its projecting portion at one end of the head is screw-threaded and receives upon it a nut F, and its projecting portion at the other end of the head is formed or provided with a transverse hole through it to receive a lathe-tool, as D or E.

The tapering collar $c$, of suitable size and shape to fit the tapering portion of the hole which is formed through the head A', is placed on the bolt B, and the tapering end of said collar overlies the transverse tool-receiving hole in the bolt B, so as to bear against the tool which may be contained in said hole and to thereby assist in holding said tool in place. The outer end of said tapering collar $c$ is made more or less oblique or cam-shaped to bear against the tool, so that by turning said collar on the bolt the inclination of the tool may be changed. By adjusting said tapering collar along on the bolt the height of the cutting edge of the tool may be changed.

The tools D or E are made tapering or wedge-shaped, as shown in Fig. 6, so that the working pressure will assist in holding them in place. The tool having been placed in the tool-receiving opening in the bolt B and the tapering collar set, the nut F on the opposite end of the bolt will be tightened to draw the parts together and hold them firmly.

By loosening the nut the bolt may be turned on its axis to vary the position of the tool, or the tapering collar may be turned on the bolt to vary the inclination of the tool, or said collar may be moved along on the bolt to vary the elevation of the tool, after which the nut may be tightened. The tool-holder may be used right or left, as desired. (See Figs. 4 and 5.)

The head A' may be formed with a pair of clamping-jaws A², adapted to receive another tool G, if desired, said tool being held in place therein by a set-screw H and nut H', adapted to clamp said jaws together. (See Figs. 7 and 8.)

I claim—

1. A tool-holder, consisting of a stock provided with a head having a hole through it, a bolt passing through said hole having a nut on one end and a transverse hole through the other end, a wedge-shaped tool therein, a collar rotatably mounted on said bolt having an oblique end which bears against said tool, substantially as described.

2. A tool-holder, consisting of a stock provided with a head having a hole through it made tapering at one end, a bolt passing through said hole having a nut on one end and a transverse hole through the other end, a wedge-shaped tool therein, a tapering collar rotatably mounted on said bolt and formed with an oblique end adapted to bear against the tool, and by adjustment thereof to adjust said tool to different inclinations, substantially as described.

3. A tool-holder, consisting of a stock provided with a head having a hole therein, a bolt passing through said hole having a nut on one end and a transverse hole through the other end, a wedge-shaped tool therein, a reciprocating and rotatable movable collar on said bolt formed with an oblique end adapted to bear against the tool, and by adjustment thereof to adjust said tool to different positions, substantially as described.

4. A tool-holder, consisting of a stock provided with a head having clamping-jaws adapted to receive and hold a tool, and also having a hole therein, a bolt passing through said hole having a nut on one end and a transverse hole through the other end, a movable collar on said bolt formed with an oblique end adapted to bear against the tool and by adjustment thereof to adjust said tool to different positions, substantially as described.

In testimony whereof I have signed my name to this specification in the presence of two subscribing witnesses.

OSCAR SELDIS.

Witnesses:
 B. J. NOYES,
 ARTHUR F. RANDALL.